United States Patent Office 3,720,769
Patented Mar. 13, 1973

3,720,769
FUNGICIDAL SULFINYLCYANOISOTHIAZOLES
Georg-Alexander Hoyer and Kurt Roder, Berlin, Germany, assignors to Schering AG, Berlin and Bergkamen, Germany
No Drawing. Filed July 10, 1970, Ser. No. 53,987
Claims priority, application Germany, Aug. 16, 1969,
P 19 42 372.4
Int. Cl. A01n 9/14
U.S. Cl. 424—270    10 Claims

ABSTRACT OF THE DISCLOSURE

Fungicidal compositions containing sulfinylcyanoisothiazoles.

The invention relates to novel sulfinylcyanoisothiazoles, to their use as fungicidal agents, and to a method of preparing the compounds.

It has now been found that compounds of the formula $$R-S-C-C-CN$$
with substituents forming the isothiazole ring system, $O_n$, $N$, $C-S-R_1$, $S$, $O_m$ wherein R and $R_1$ are radicals of an aliphatic hydrocarbon having 2 to 8 carbon atoms, and $n$ and $m$ are 0 or 1, $n+m$ being 1 or 2, have good fungicidal and fungistatic effects which make them suitable particularly for controlling diseases of plants caused by fungi.

The compounds, and particularly 3,5-bis-(ethane-1-sulfinyl)-4-cyanoisothiazole, have remarkable fungicidal effects. They are distinguished, for example, by a broad spectrum of effectiveness and control numerous fungi which are pathogenic to plants; such as *Aspergillus niger*, *Botrytis cinerea*, *Colletrotrichum gloeosporioides*, *Rhizoctonia solani*, *Stemphylium ilicis* and the like.

Moreover, they are particularly effective against diseases of cereal crops of the genera Fusarium and Helminthosporium, and may therefore also be used in the control of parasitic fungi on seed grain. They may also be used to advantage in rice cultures.

The compounds of the invention are superior in their effects to known compounds having a similar field of application, such as zinc ethylene-bis-dithiocarbamate, also known under the trademark Zineb; or a similar chemical structure, such as those described in South African Patent No. 68/3355.

The compounds of the invention may therefore be employed as sprays or seed disinfectants in agriculture or horticulture for the treatment of plants or seed grain.

The active agents of the invention may be used singly or in mixtures of several of the compounds. If so desired, other fungicides, nematocides, herbicides, disinfectants or other pest control agents may be added, depending on the desired result. The compounds of the invention are preferably employed in the form of compositions, such as powders, granulates, solutions, emulsions or suspensions, with the addition of liquid and/or solid carriers or diluents, and optionally with wetting agents, adhesion enhancing agents, emulsifying and/or dispersing agents.

Suitable liquid carriers include water, mineral oil, or other organic solvents, such as xylene, chlorobenzene, cyclohexanol, cyclohexanone, dioxane, acetonitrile, ethyl acetate, dimethylformamide, isophorone, dimethylsulfoxide, and the like.

Suitable solid carriers include lime, kaolin, chalk, talcum, attaclay and other clays, and natural as well as synthetic silica.

As surfactants, there may be included the salts of ligninesulfonic acids, salts of alkylated benzenesulfonic acids, sulfonated acid amides and their salts, polyethoxylated amines and alcohols, and the like.

When the compounds of the invention are intended for the treatment of seed grain, they may be mixed with dyes, such as new funchsine ($C_{22}H_{23}_3$·HCl) and the like, in order to impart a clearly visible color to the treated seed grain.

The concentration of the active agent or agents of the invention may be varied within the wide limits, the optimum concentration depending primarily on the amount in which the compounds are intended to be used for soil or seed treatment.

By way of example, the compositions may contain approximately 1 to 80 percent (by weight), and preferably 20 to 50 percent of the active agent, and approximately 99 to 20 percent liquid or solid carrier, and optionally up to 20 percent surfactants.

Typical compositions of the invention are listed below:

(a) Dry seed disinfectant: | Percent
--- | ---
Active agent | 50
Dyestuff | 0.1–0.3
Paraffin oil | 1–3
Carrier (talcum) | Balance (b) Dry seed disinfectant: |
--- | ---
Active agent | 20
Dyestuff | 0.1–0.3
Paraffin oil | 1–3
Carrier (talcum) | Balance (c) Disinfectant slurry: |
--- | ---
Active agent | 50
Dyestuff | 0.1–0.3
Wetting agent | 5–10
Carrier (talcum) | Balance (d) Liquid disinfectant: |
--- | ---
Active agent | 20
Dyestuff | 0.1–0.3
Diluent (ethanol, isopropanol) | Balance The new compounds may be prepared according to known methods, for example, by treating compounds of the formula $$R-S-C-C-CN$$
$$N \quad C-S-R_1$$
$$\quad S$$

wherein R and $R_1$ are each radicals of aliphatic hydrocarbons having 2 to 8 carbon atoms, with oxidizing agents, preferably hydrogen peroxide or percarboxylic acids, such as peracetic acid, peroxybenzoic acid, m-chloroperoxybenzoic acid, or monoperoxyphthalic acid in inert solvents.

Solvents which may be employed include carboxylic acid, such as formic acid, acetic acid, or propionic acid, anhydrides or carboxylic acid, such as acetic anhydride or propionic anhydride, ketones such as acetone or methylethylketone, inert organic solvents such as diethyl ether, ethyl acetate, benzene, methylene chloride, chloroform or ethanol, with or without water.

The reaction temperature should be approximately between 0° and 120° C.

The general procedure for preparing the active agents of the invention will now be described.

(a) 0.2 mole 30% hydrogen peroxide is added slowly drop by drop to a solution of 0.1 mole of a 3,5-dialkylmercapto-4-cyanoisothiazole in 200 ml. glacial acetic acid at about 30° C. The mixture is left to stand at room temperature for three days, whereupon 4 g. manganese dioxide are added, and the mixture is heated for one hour at 60° C. and then filtered. The filtrate is partly evaporated and poured into 500 ml. water. The solution is extracted with methylene chloride, and the extract is washed with sodium carbonate solution and then with water, dried over magnesium sulfate, and evaporated. The crude product is a mixture of the two monosulfoxides and of the disulfoxide. The three compounds are separated by chromatography on silica gel with a mixture of benzene and chloroform. The yields vary greatly and are between 1 and 60% of the theoretically expected amount.

(b) 0.2 mole 30% hydrogen peroxide is added slowly drop by drop to a solution of 0.1 mole of a 3,5-dialkyl-mercapto-4-cyanoisothiazole in 100 ml. glacial acetic acid and 100 ml. acetic anhydride at about 110° C. Stirring is continued for a few hours, and the mixture is left to stand overnight, whereupon it is poured into 500 ml. water and extracted with methylene chloride. The extract is washed with sodium carbonate solution and then with water, dried over magnesium sulfate, and evaporated. The product obtained contains about 90% of the 3,5-bis-(alkanesulfinyl)-4-cyanoisothiazole. The yields are between 80 and 100%.

Compounds of the invention are listed below.

3-ethylmercapto-5-(ethane-1-sulfinyl)-4-cyanoisothiazole—M.P. 58–59° C.
3-propylmercapto-5-(propane-1-sulfinyl)-4-cyanoisothiazole—M.P. 50–51° C.
3-isopropylmercapto-5-(propane-2-sulfinyl)-4-cyanoisothiazole—$n_D^{20}$ 1.5841
3-(ethane-1-sulfinyl)-5-ethylmercapto-4-cyanoisothiazole—M.P. 35–36° C.
3-(propane-1-sulfinyl)-5-propylmercapto-4-cyanoisothiazole—M.P. 55–57° C.
3,5-bis-(ethane-1-sulfinyl)-4-cyanothiazole—M.P. 79–80° C.
3,5-bis-(propane-1-sulfinyl)-4-cyanoisothiazole—M.P. 76–78° C.
3,5-bis-(butane-1-sulfinyl)-4-cyanoisothiazole—$n_D^{20}$ 1.5697
3,5-bis-(hexane-1-sulfinyl)-4-cyanoisothiazole—M.P. 52–54° C.

The compounds are generally crystalline, colorless substances soluble in organic solvents such as ethanol, acetone, ethyl acetate, benzene, chloroform, tetrahydrofuran, acetonitrile, dimethylformamide, dimethylsulfoxide and the like.

The superior fungicidal effects of the compounds of the invention as compared to known agents are evident from the following examples.

EXAMPLE 1

The fungicidal effects of compounds of the invention and of known compounds (South African Pat. No. 68/3,355) were tested on synthetic nutrient media in Petri dishes infected with fungi pathogenic to plants (agar test). Prior to the test, the nutrient medium consisting of 2% malt extract and 1.5% agar powder was sterilized. The active agents were added before the medium gelled in such an amount that the medium contained 10 p.p.m. active agent. After solidification, the medium was inoculated. With fungi forming spores, each Petri dish was inoculated with an eye of platinum wire containing 100 spores. Fungi which do not form spores, such as Rhizoctonia, were transferred in the form of pieces of mycelium having a diameter of 5 mm. The latter were evaluated after three days, the spore forming fungi after 5 days at 22° C., by measuring the diameter of the fungus culture formed.

| | Relative diameter of colony in mm. | | | | | |
|---|---|---|---|---|---|---|
| | Asp. | Botr. | Coll. | Fus. | Rhiz. | Stemph. |
| Agent: | | | | | | |
| 3-ethylmercapto-5-(ethane-1-sulfinyl)-4-cyanoisothiazole | 0 | 0 | 0 | 0 | 30 | 0 |
| 3-propylmercapto-5-(propane-1-sulfinyl)-4-cyanoisothiazole | 0 | 8 | 0 | 11 | 20 | 0 |
| 3-isopropylmercapto-5-(propane-2-sulfinyl)-4-cyanoisothiazole | 30 | 13 | 33 | 37 | 30 | 0 |
| 3,5,-bis(butane-1-sulfinyl)-4-cyanoisothiazole | | | | 0 | 18 | 22 | 0 |
| 3,5-bis-(hexane-1-sulfinyl)-4-cyanoisothiazole | 0 | | 0 | 37 | 23 | 0 |
| South African patent: | | | | | | |
| 3,5-diethylmercapto-4-cyanoisothiazole | 70 | 20 | 67 | 44 | 40 | 32 |
| 3,5-dihexylmercapto-4-cyanoisothiazole | 82 | 23 | 80 | 56 | 50 | 45 |
| 3,5-didodecylmercapto-4-cyanoisothiazole | 76 | 20 | 67 | 48 | 50 | 45 |
| 3,5-diisopropylmercapto-4-cyanoisothiazole | 76 | 27 | 50 | 56 | 55 | 32 |
| Zineb (zincethylene-bis-dithiocarbamate) | 76 | 27 | 67 | 56 | 60 | 32 |
| Control | 100 | 100 | 100 | 100 | 100 | 100 |

NOTE.—Asp.=Aspergillus niger; Botr.=Botrytis cinerea; Coll.=Colletotrichum gloeosporioides; Fus.=Fusarium nivale; Rhiz.=Rhizoctonia solani; Stemph.=Stemphylium ilicis.

EXAMPLE 2

Seed barley naturally infested with Helminthosporium gramineum was thoroughly mixed with the agents to be tested, then laid out in soil, and exposed to a temperature of 5° to 10° C. The percentage of infected plants was determined after 3–4 weeks by inspection of the defected primary leaves. The tested compositions contained 50% of the active agent together with kaolin, talcum, chalk, dyestuff and oil as conventional ingredients.

| | Relative infestation, percent g. active agent/100 kg. barley | | |
|---|---|---|---|
| Agent | 50 g. | 25 g. | 10 g. |
| 3-(propane-1-sulfinyl)-5-propylmercapto-4-cyanoisothiazole | 0 | 13 | 39 |
| 3-(ethane-1-sulfinyl)-5-ethylmercapto-4-cyanoisothiazole | 0 | 4.8 | 15 |
| 3,5-bis-(propane-1-sulfinyl)-4-cyanoisothiazole | 0 | 4.1 | 8.3 |
| 3,5-bis-(ethane-1-sulfinyl)-4-cyanoisothiazole | 0 | 0 | 3.1 |
| 3,5-dipropylmercapto-4-cyanoisothiazole | 40 | 100 | 100 |
| 3,5-diisopropylmercapto-4-cyanoisothiazole | 52 | 100 | 100 |
| 3,5-dipropargylmercapto-4-cyanoisothiazole | 100 | 100 | 100 |
| Control | 100 | 100 | 100 |

EXAMPLE 3

Seed rye infested with Fusarium nivale was thoroughly mixed with the compositions to be tested, transferred to soil, and kept at temperatures of 5°–10° C. Depending on the degree of infestation, the results were evaluated after 3 to 6 weeks. The compositions tested contained 50% active agent together with kaolin, talcum, chalk, dyestuff, and oil as conventional ingredients.

| Agent: | Reactive Infestation, percent g. active agent/100 kg. rye 100 g. |
|---|---|
| 3-(propane-1-sulfinyl) - 5 - propyl-mercapto-4-cyanoisothiazole | 41 |
| 3,5-bis-(ethane-1-sulfinyl)-4-cyanoisothiazole | 0 |
| 3,5-bis-(propane-1-sulfinyl) - 4 - cyanoisothiazole | 11 |
| 3,5-diethylmercapto-4-cyanoisothiazole | 100 |
| 3,5-dihexylmercapto-4-cyanoisothiazole | 100 |
| 3,5-didodecylmercapto-4-cyanoisothiazole | 100 |
| 3,5-dipropargylmercapto-4-cyanothiazole | 100 |
| Control | 100 |

What is claimed is:

1. A fungicidal composition for the treatment of plants or seed grain consisting essentially of from about 1 to about 80 percent by weight of at least one fungicidal agent of the formula

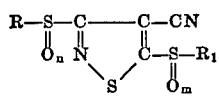

wherein R and $R_1$ are individually selected from the group consisting of alkyl radicals having from 2 to 6 carbon atoms and wherein $m$ and $n$ are 0 or 1 provided both $m$ and $n$ are not 0 and a liquid carrier or solid carrier therefor.

2. The composition of claim 1 wherein the fungicidal agent is 3-ethylmercapto-5-(ethane-1-sulfinyl)-4-cyanoisothiazole.

3. The composition of claim 1 wherein the fungicidal agent is 3-propylmercapto-5-(propane-1-sulfinyl)-4-cyanoisothiazole.

4. The composition of claim 1 wherein the fungicidal agent is 3-isopropylmercapto-5-(propane-2-sulfinyl) - 4-cyanoisothiazole.

5. The composition of claim 1 wherein the fungicidal agent is 3-(ethane-1-sulfinyl)-5-ethylmercapto-4 - cyanoisothiazole.

6. The composition of claim 1 wherein the fungicidal agent is 3-(propane-1-sulfinyl) - 5 - propylmercapto-4-cyanoisothiazole.

7. The composition of claim 1 wherein the fungicidal agent is 3,5-bis-(ethane-1-sulfinyl)-4-cyanoisothiazole.

8. The composition of claim 1 wherein the fungicidal agent is 3,5-bis-(propane-1-sulfinyl)-4-cyanoisothiazole.

9. The composition of claim 1 wherein the fungicidal agent is 3,5-bis-(butane-1-sulfinyl)-4-cyanoisothiazole.

10. The composition of claim 1 wherein the fungicidal agent is 3,5-bis-(hexane-1-sulfinyl)-4-cyanothiazole.

References Cited

Chemical Abstracts 71:124429g, January 1969.

JEROME D. GOLDBERG, Primary Examiner

L. SCHENKMAN, Assistant Examiner